(12) United States Patent
Jeon

(10) Patent No.: US 10,257,195 B2
(45) Date of Patent: Apr. 9, 2019

(54) APPARATUS AND METHOD FOR PROVIDING AUTHORIZATION BASED ENHANCED ADDRESS BOOK SERVICE IN MOBILE COMMUNICATION SYSTEM

(71) Applicant: Samsung Electronics Co., Ltd., Gyeonggi-do (KR)

(72) Inventor: Yong-Joon Jeon, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 2 days.

(21) Appl. No.: 14/591,610

(22) Filed: Jan. 7, 2015

(65) Prior Publication Data

US 2015/0113613 A1    Apr. 23, 2015

Related U.S. Application Data

(63) Continuation of application No. 13/453,384, filed on Apr. 23, 2012, now Pat. No. 8,949,942.

(30) Foreign Application Priority Data

Jul. 19, 2011    (KR) .......................... 10-2011-0071390

(51) Int. Cl.
| | |
|---|---|
| *H04L 29/06* | (2006.01) |
| *H04M 1/725* | (2006.01) |
| *H04L 12/58* | (2006.01) |
| *H04L 29/08* | (2006.01) |
| *H04M 1/2745* | (2006.01) |

(52) U.S. Cl.
CPC .............. *H04L 63/10* (2013.01); *H04L 51/32* (2013.01); *H04L 67/104* (2013.01); *H04M 1/72552* (2013.01); *H04M 1/274516* (2013.01)

(58) Field of Classification Search
CPC ....................................................... H04L 63/08
USPC ............................................................ 726/4
See application file for complete search history.

(56) References Cited

U.S. PATENT DOCUMENTS

| | | | |
|---|---|---|---|
| 2004/0111505 A1 | 6/2004 | Callahan et al. | |
| 2004/0117818 A1 | 6/2004 | Karaoguz et al. | |
| 2004/0249953 A1* | 12/2004 | Fernandez | H04L 29/06 709/227 |

(Continued)

FOREIGN PATENT DOCUMENTS

| | | |
|---|---|---|
| EP | 1 662 731 | 5/2006 |
| EP | 1 662 731 A1 * | 5/2006 |

(Continued)

OTHER PUBLICATIONS

Korean Office Action dated Jan. 4, 2017 issued in counterpart application No. 10-2011-0071390, 12 pages.

(Continued)

*Primary Examiner* — Peter C Shaw
(74) *Attorney, Agent, or Firm* — The Farrell Law Firm, P.C.

(57) ABSTRACT

Method and apparatus are provided for transmitting information to share to an external device, without using a presence server. The method includes determining, by an electronic device, that information to share is updated; identifying a recipient to receive the information to share, based at least in part on a list of one or more authorized entities stored in the electronic device; and transmitting the information to share to an external device corresponding to the recipient, without using a presence server.

12 Claims, 3 Drawing Sheets

(56) References Cited

U.S. PATENT DOCUMENTS

| | | |
|---|---|---|
| 2006/0112177 A1 | 5/2006 | Berkley et al. |
| 2007/0008987 A1 | 1/2007 | Manion et al. |
| 2007/0086435 A1* | 4/2007 | Kaler .............. H04L 67/104 370/352 |
| 2007/0220005 A1* | 9/2007 | Castro Castro ......... H04W 4/08 |
| 2007/0275696 A1* | 11/2007 | Cheng ............... H04L 12/581 455/412.1 |
| 2008/0102802 A1 | 5/2008 | Do et al. |
| 2009/0047972 A1 | 2/2009 | Neeraj |
| 2009/0156179 A1 | 6/2009 | Hahn et al. |
| 2009/0296606 A1 | 12/2009 | Ravikumar et al. |
| 2010/0205242 A1* | 8/2010 | Marchioro, II ........ G06Q 10/10 709/203 |
| 2010/0280904 A1* | 11/2010 | Ahuja ................. G06Q 30/02 705/14.58 |
| 2011/0171958 A1* | 7/2011 | Hua .................... H04W 60/06 455/435.2 |
| 2011/0173681 A1* | 7/2011 | Qureshi et al. ................... 726/4 |
| 2012/0079086 A1* | 3/2012 | Miettinen .............. G06Q 10/10 709/222 |
| 2013/0226444 A1* | 8/2013 | Johansson ............. G06F 3/0488 701/300 |
| 2016/0021127 A1* | 1/2016 | Yan ...................... G06F 21/554 72x6/23 |

FOREIGN PATENT DOCUMENTS

| | | | |
|---|---|---|---|
| EP | 1 703 453 | 9/2006 | |
| KR | 1020030030747 | 4/2003 | |
| KR | 1020060058002 | 5/2006 | |
| KR | 1020080033239 | 4/2008 | |
| KR | 1020080038946 | 5/2008 | |
| WO | WO 2006091178 A1 * | 8/2006 | ......... H04L 12/1895 |
| WO | WO 2008087474 A2 * | 7/2008 | ...... H04M 1/274516 |
| WO | WO-2008087474 A2 * | 7/2008 | ...... H04M 1/274516 |

OTHER PUBLICATIONS

Korean Office Action dated Sep. 12, 2017 issued in counterpart application No. 10-2011-0071390, 3 pages.
Korean Office Action dated Jul. 10, 2017 issued in counterpart application No. 10-2011-0071390, 8 pages.
European Search Report dated Jun. 18, 2018 issued in counterpart application No. 12162714.5-1216, 4 pages.
European Search Report dated Jan. 31, 2019 issued in counterpart application No. 12162714.5-1216, 4 pages.

* cited by examiner

APPARATUS AND METHOD FOR PROVIDING AUTHORIZATION BASED ENHANCED ADDRESS BOOK SERVICE IN MOBILE COMMUNICATION SYSTEM

PRIORITY

The present application is a continuation of U.S. application Ser. No. 13/453,384, which was filed in the U.S. Patent and Trademark Office on Apr. 23, 2012, and claims priority under 35 U.S.C. § 119(a) to Korean Patent Application Serial No. 10-2011-0071390, which was filed in the Korean Intellectual Property Office on Jul. 19, 2011, the entire disclosure of each of which is hereby incorporated by reference.

BACKGROUND OF THE INVENTION

1. Field of the Invention

The present invention relates generally to a mobile communication system and more particularly, the present invention relates to an apparatus and a method for providing an authorization based Enhanced Address Book (EAB) service in the mobile communication system.

2. Description of the Related Art

An Enhanced Address Book (EAB) service allows users accessing a communication network to share information updated by the users. For example, the EAB service includes user status display in an instant messenger commonly used today, and profile information sharing in Social Network Services (SNSs) such as Facebook® and Twitter®.

For the EAB service, when information of a particular user is changed, a system should provide the changed information to other users who can share the information of the particular user, by utilizing a presence server. For example, Rich Communication Suite (RCS) technology standardized by the Global System for Mobile communication Association (GSMA) provides the EAB service using the presence server. The presence server manages a contact list of the users. Accordingly, upon recognizing the information change of the particular user, the presence server can provide the changed information to other users using an event. In other words, the presence server can identify other users who can share the information of the particular user, using the contact list, and then provide the changed information to the other users.

As discussed above, the method based on the presence server clarifies the process by rapidly reflecting the changed information. However, as the number of users increases, the computation of the presence server increases, resulting in an increased load of the presence server, along with an increased error rate in the computation. Hence, a solution for addressing the disadvantages of the presence server is needed.

SUMMARY OF THE INVENTION

Accordingly, the present invention has been made to solve at least the above-described problems and/or disadvantages and to provide at least the advantages below. Accordingly, an aspect of the present invention is to provide an apparatus and a method for providing an Enhanced Address Book (EAB) service without a presence server in a mobile communication system.

Another aspect of the present invention is to provide an apparatus and a method for providing an EAB service through Peer to Peer (P2P) transmission in a mobile communication system.

Another aspect of the present invention is to provide an apparatus and a method for providing an authorization based EAB service in a mobile communication system.

According to an aspect of the present invention, an apparatus is provided, which includes a memory configured to store a list of one or more authorized entities; and a processor operatively coupled with the memory, the processor configured to determine that information to share is updated; identify a recipient to receive the information to share based at least in part on the list; and transmit the information to share to an electronic device corresponding to the recipient, without using a presence server.

According to another aspect of the present invention, a method is provided, which includes determining, by an electronic device, that information to share is updated; identifying a recipient to receive the information to share, based at least in part on a list of one or more authorized entities stored in the electronic device; and transmitting the information to share to an external device corresponding to the recipient, without using a presence server.

According to another aspect of the present invention, a machine-readable storage device is provided for storing instructions that, when executed by one or more processors, cause the one or more processors to perform operations including determining, by the one or more processors, that information to share is updated; identifying a recipient to receive the information to share, based at least in part on a list of one or more authorized entities stored in an electronic device; and transmitting the information to share to an external device corresponding to the recipient, without using a presence server.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE PRESENT INVENTION

Figure 1:
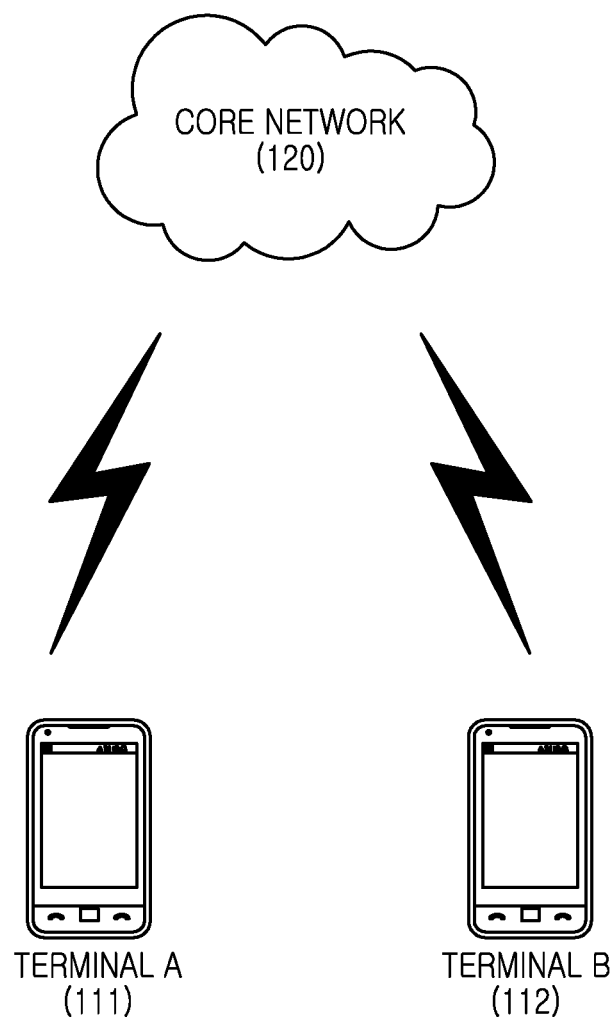
FIG. 1 is a diagram illustrating a mobile communication system according to an embodiment of the present invention.

Various embodiments of the present invention are described in detail with reference to the accompanying drawings. The same or similar components may be designated by the same or similar reference numerals throughout the drawings. Detailed description of known functions and constructions are omitted to avoid obscuring the subject matter of the present invention and for clarity and conciseness.

Embodiments of the present invention provide a technique for providing an Enhanced Address Book (EAB) service without a presence server in a mobile communication system.

FIG. 1 is a diagram illustrating a mobile communication system according to an embodiment of the present invention.

Referring to FIG. 1, the system includes a terminal A 111, a terminal B 112, and a core network 120. The terminal A 111 and the terminal B 112 are user equipments, and capable of communicating with other terminals or using the Internet by wirelessly accessing the core network 120. The core network 120, which is a system network, includes a base station (not shown) for providing wireless access to the terminal A 111 and the terminal B 112. The system according to an embodiment of the present invention does not include a presence server. The presence server, if any, does not provide information for the EAB service.

The terminal A 111 and the terminal B 112 share information updated by one terminal through the EAB service. Herein, the update encompasses the change and the new generation. For example, the information can include a phrase or an icon indicating the status of the user, a profile picture, and an introduction phrase in a profile. For the EAB service, the terminal A 111 and the terminal B 112 perform an authorization procedure between the terminals. The authorization procedure is a predetermined procedure for automatically sharing the information updated by one terminal. More specifically, the authorization procedure transmits the information to the other terminal without intervention of the user when the information is updated, and receives the updated information from the other terminal without the intervention of the user. After the authorization procedure, when the terminal A 111 or the terminal B 112 updates the information of the user, the updated information is automatically transmitted to the terminal B 112 or the terminal A 111 without intervention of the user. The information is transmitted according to a Peer to Peer (P2P) transmission scheme without passing through a separate server.

Figure 2:
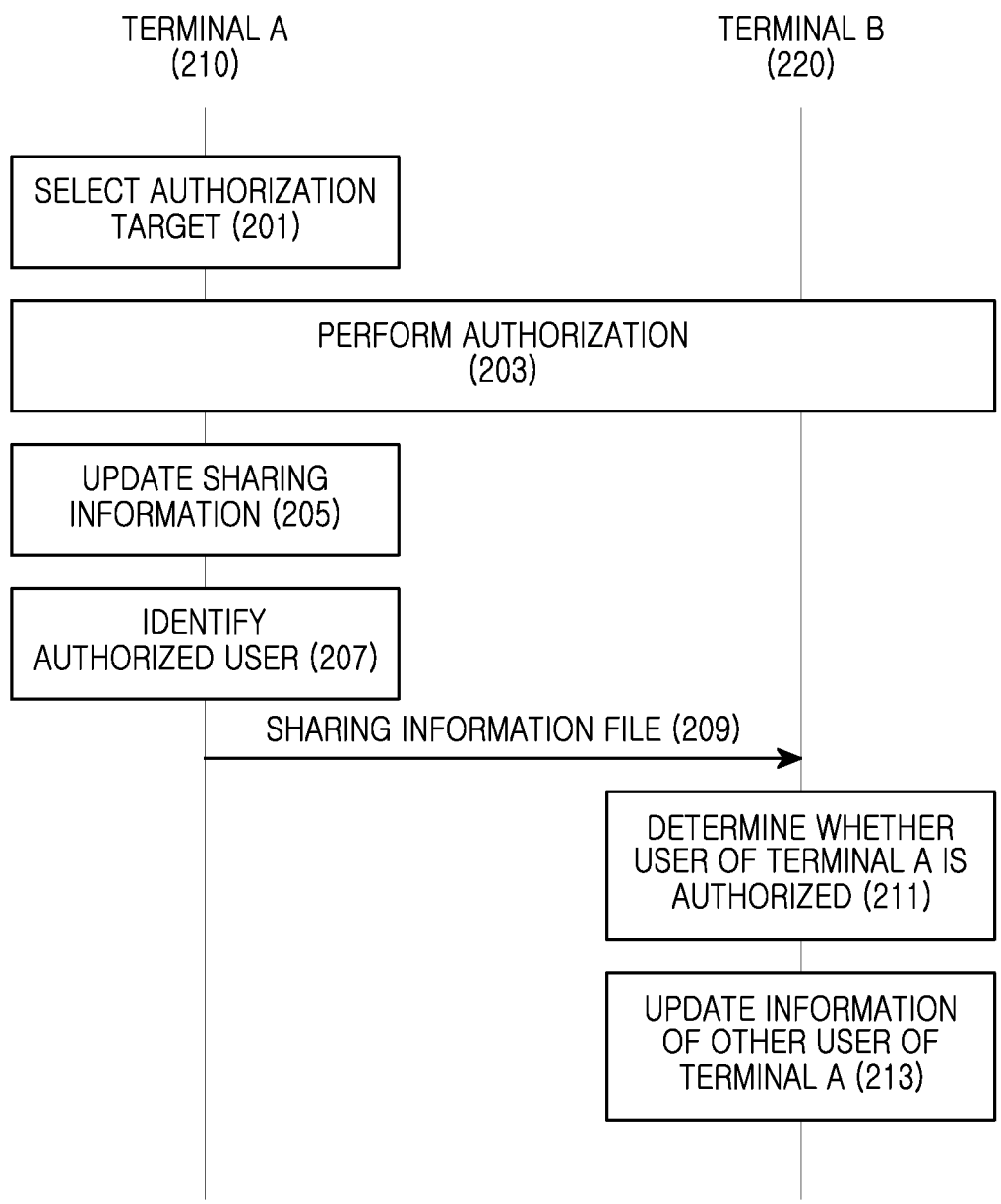
FIG. 2 is a diagram illustrating of authorization and information sharing of terminals in the mobile communication system according to an embodiment of the present invention.

FIG. 2 is a diagram illustrating the authorization and the information sharing of terminals in the mobile communication system according to an embodiment of the present invention.

Referring to FIG. 2, in step 201, a terminal A 210 selects an authorization target; that is, selecting the other user to request authorization of the terminal A 210. That is, the terminal A 210 displays a list of the other users in the contact list according to user input, and determines at least one authorization target in the list according to user selection. As such, a plurality of the other users can be selected. Herein, it is assumed that a single user; that is, a terminal B 220 is selected.

In step 203, the terminal A 210 performs the authorization procedure with the terminal B 220. In further detail, the terminal A 210 transmits a message requesting the authorization to the terminal B 220. The message requesting the authorization inquires about whether to receive the sharing information without user intervention. Hence, the terminal B 220 informs its user of the authorization request for the information sharing from a user of the terminal A 210 using a display means, and checks the user selection. That is, the authorization request can be permitted or rejected. When the authorization is rejected, this process is ended. When the authorization is permitted, the terminal B 220 transmits a message informing the terminal A 210 of the permitted authorization. When the authorization is permitted, the terminal A 210 adds identification information of the user of the terminal B 220 to its authorizer list, and the terminal B 220 adds identification information of the user of the terminal A 210 to its authorizer list. For example, the identification information can include an e-mail, an IDentifier (ID) of a particular community service, a device identifier, and an identifier allocated in the communication system. Thus, the terminal A 210 and the terminal B 220 can display that the other terminal is authorized in the contact list. Herein, it is assumed that the terminal B 220 permits the authorization.

In step 205, the terminal A 210 updates the sharing information. For example, the sharing information can include at least one of a phrase or an icon indicating the user status, a profile picture, and an introduction phrase in the profile. For example, the sharing information can be updated when the user registers a new profile picture, changes the introduction phrase, or changes the status icon, or when the status icon is changed as a certain condition is satisfied in the event manner.

In step 207, the terminal A 210 checks the list of the authorized users. That is, the terminal A 210 confirms the identification information of the other user to transmit the sharing information by loading its authorizer list. According to the authorization in step 203, the terminal A 210 can identify the user of the terminal B 220.

In step 209, the terminal A 210 transmits the sharing information to the terminal B 220. That is, the terminal A 210 transmits the sharing information to the terminal B 220 without user intervention; that is, without checking a user transmission command. Herein, the sharing information is encoded in a predefined file type and then transmitted. For example, the sharing information can be encoded using eXtensible Markup Language (XML), vCard, or a system unique format. As such, the file is delivered from the terminal A 210 to the terminal B 220 according to the P2P scheme without passing through a separate server.

In step 211, the terminal B 220 receiving the file determines whether the user of the terminal A 210 transmitting the file is the authorized user. That is, the terminal B 220 determines whether it is authorized to receive the information provided from the terminal A 210 transmitting the file without user intervention; that is, without checking a user acceptance command. That is, the terminal B 220 determines whether its authorizer list includes the identification information of the user of the terminal A 210. According to the authorization in step 203, the terminal B 220 can identify the terminal A 210.

In step 213, the terminal B 220 updates the information of the terminal A 210. That is, the terminal B 220 restores the sharing information by decoding the file without checking the user acceptance command, and then stores the restored information. Hence, the user of the terminal B 220 can use the updated information of the user of the terminal A 210.

In FIG. 2, the authorization of step 203 is to share the information of the terminal A 210 with the terminal B 220. That is, the authorization of step 203 is the unilateral authorization procedure to authorize the terminal B 220 to receive the information from the terminal A 210. From user standpoint, the authorizer list can include a transmission authorizer list including other users that authorize to receive information from the terminal, and a reception authorizer list including other users that the terminal are authorize to receive information from the other users. Namely, the transmission authorizer list is referred to when the terminal A 210 transmits the information, and the reception authorizer list is referred to when the terminal B 220 receives the information from the other terminal.

However, the authorization procedure can be a bilateral authorization in other embodiments of the present invention. That is, the authorization procedure can simultaneously authorize the terminal B 220 to receive the information from the terminal A 210 and the terminal A 210 to receive the information from the terminal B 220. Unlike the unilateral authorization, the terminal manages only one authorizer list because the transmission authorizer list and the reception authorizer list are the same.

Further, in various embodiments of the present invention, when the terminal B 220 requested to authorize permits the authorization, the terminal B 220 can request the terminal A 210 to authorize the terminal B 220 using a message indicating authorization permission. In this case, when the terminal A 210 receives the message permitting the authorization to the terminal B 210, bilateral authorization is accomplished.

Figure 3:
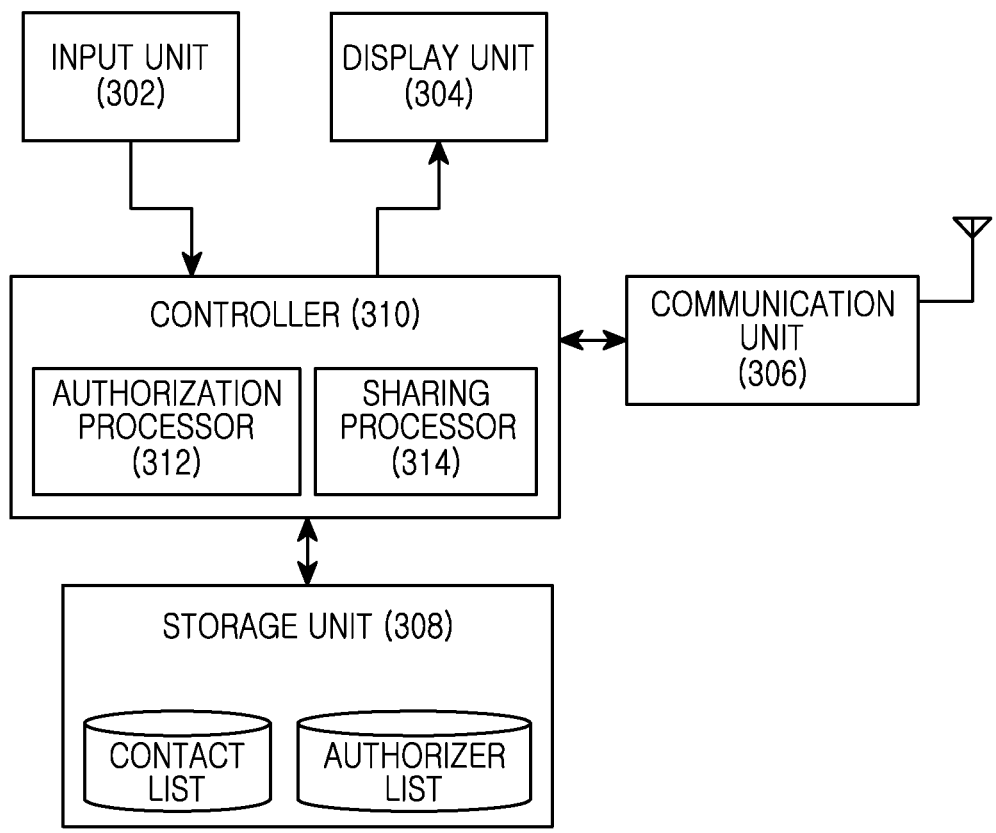
FIG. 3 is a block diagram illustrating the terminal in the mobile communication system according to an embodiment of the present invention.

FIG. 3 is a block diagram of the terminal in the mobile communication system according to an embodiment of the present invention.

Referring to FIG. 3, the terminal includes an input unit 302, a display unit 304, a communication unit 306, a storage unit 308, and a controller 310.

The input unit 302 recognizes the input from the user, and provides information corresponding to the input to the controller 310. That is, the input unit 302 processes the user input via a keyboard, a keypad, a touch screen, a touch pad, a mouse, and a special function button. The display unit 304 displays status information in the operations of the terminal, and number, character, and image according to an application program execution. That is, the display unit 304 displays image data provided from the controller 310 in a visual screen. For example, the display unit 304 can be implemented using a Liquid Crystal Display (LCD), an Organic Light-Emitting Diode (OLED), and the like.

The communication unit 306 provides interface for transmitting and receiving signals over a radio channel. More specifically, the communication unit 306 converts transmit data to a Radio Frequency (RF) signal, transmits the RF signal via an antenna, and converts an RF signal received via the antenna to the receive data. The communication unit 306 converts the data and the RF signal in conformity with a standard of the communication system. Alternatively, the communication unit 306 can provide an interface for the wired connection to the core network.

The storage unit 308 stores a basic program for the operation of the terminal, an application program, and data such as user contents. Particularly, the storage unit 308 stores the contact list and the authorizer list. The storage unit 308 provides the stored data according to the request of the controller 310.

The controller 310 controls functions of the terminal. In detail, an authorization processor 312 of the controller 310 controls the authorization to share the information with other user terminal. When the sharing information is updated according to the result of the authorization, a sharing processor 314 of the controller 310 transmits the updated sharing information to the authorized user terminal or receives the updated sharing information from the authorized user terminal. The authorization and sharing operations of the controller 310 are explained in more detail below.

To request the authorization, the controller 310 selects the other terminal to request authorization. That is, the controller 310 displays the list of the other users in the contact list in the display unit 304 according to the user input, and determines at least one authorization target in the list according to user selection recognized through the input unit 302. As such, a plurality of the targets can be selected. When at least one authorization target is selected, the controller 310 transmits the message requesting the authorization to the at least one authorization target selected. Next, when receiving the message permitting the authorization from the at least one selected authorization target, the controller 310 adds the other terminal permitting authorization to the authorizer list stored to the storage unit 308.

To permit authorization, upon receiving the message requesting authorization for the other user, the controller 310 informs the user that authorization is requested from the other user using the display unit 304, and confirms user selection; that is, the permission or rejection command through the input unit 302. When authorization is permitted, the controller 310 transmits the message informing the terminal of the other user of the authorization permission through the communication unit 306. Next, the controller 310 adds the other user to the authorizer list stored to the storage unit 308.

To transmit the sharing information, when the sharing information is updated by the user input, the controller 310 loads the authorizer list stored to the storage unit 308 and obtains the identification information of at least one authorized user. For example, the sharing information can include at least one of the phrase or the icon indicating the user status, the profile picture, and the introduction phrase in the profile. After identifying the authorized user, the controller 310 transmits the sharing information to the terminal of the at least one authorized user. As such, the controller 310 encodes the sharing information in a predefined file type and then transmits the encoded information.

To receive the sharing information, upon receiving the file including the sharing information from the terminal of the other user, the controller 310 determines whether the other user is the authorized user by loading the stored authorizer list to the storage unit 308. That is, the controller 310 determines whether the authorizer list includes the identification information of the other user. When confirming the authorized user, the controller 310 restores the sharing information by decoding the file, and then updates the information of the other user using the restored information.

As set forth above, by realizing the EAB service without the presence server in mobile communication system, the burden on the provider can be reduced and possible errors in the presence server can be avoided. In addition, the information is selectively transmitted only to authorized users.

While the present invention has been shown and described with reference to certain embodiments thereof, it will be understood by those skilled in the art that various changes in form and detail may be made without departing from the spirit and scope of the present invention as defined by the appended claims and any equivalents thereof.

What is claimed is:

1. A first user device comprising:
 a memory configured to store an authorization list, wherein the authorization list includes address information corresponding to at least one first entity, and wherein sharing information includes information on at least one of a status or a profile of an entity of the first user device;
 a communication circuitry configured to transmit the sharing information to a second user device corresponding to the at least one first entity; and
 a processor operatively coupled with the memory, the processor configured to:
 determine that the sharing information is updated by detecting an update of at least one of a profile picture or an introduction phrase which is the profile information;
 identify the at least one first entity included in the authorization list in response to determining that the sharing information is updated; and control the communication circuitry to transmit, in response to identifying the at least one first entity, the updated sharing information to the second user device corresponding to the identified at least one first entity using the address information of the identified at least one first entity through a direct communication path between the first user device and the second user device without passing through a separate server, using a peer-to-peer (P2P) scheme, wherein the authorization list includes a transmission authorization list and a reception authorization list which is distinct from the transmission authorization list, wherein the transmission authorization list includes the at least one first entity which authorizes the first user device to transmit the sharing information to the second user device of the at least one first entity, wherein the transmission authorization list is referred to when the first user device transmits the sharing information to the second user device, wherein the reception authorization list includes at least one second entity, wherein the entity of the first user device authorizes a third user device of the at least one second entity to transmit the sharing information including at least one of a status and a profile of the at least one second entity to the first user device, and wherein the reception authorization list is referred to when the first user device receives, from the third user device, the sharing information including at least one of the status and the profile of the at least one second entity.

2. The first user device of claim 1, wherein the identification information further comprises an e-mail address.

3. The first user device of claim 1, wherein the processor is further configured to store the identification information in the authorization list.

4. The first user device of claim 1, wherein the processor is further configured to transmit the sharing information directly to the second user device.

5. The first user device of claim 1, wherein the sharing information comprises a phrase, an icon, an image corresponding to a state of a user of the second user device, or any combination thereof.

6. The first user device of claim 1, wherein the sharing information is encoded using at least one of extensible markup language, a vCard, and a unique system format.

7. The first user device of claim 1, wherein the processor is further configured to transmit the sharing information as a file of a predefined type.

8. A method comprising:
determining, by a processor of a first user device, that sharing information to be shared from the first user device is updated, wherein the sharing information includes information on at least one of a status or a profile of an entity of the first user device;
identifying, by the processor, at least one first entity included in an authorization list in response to determining that the sharing information is updated, wherein the authorization list includes address information corresponding to the at least one first entity; and
transmitting, by a communication circuitry of the first user device, in response to identifying the at least one first entity, the updated sharing information to a second user device corresponding to the identified at least one first entity using the address information of the identified at least one first entity through a direct communication path between the first user device and the second user device without passing through a separate server, using a peer-to-peer (P2P) scheme, wherein determining that sharing information to be shared from the first user device is updated comprises detecting an update of at least one of a profile picture or an introduction phrase which is the profile information, wherein the authorization list includes a transmission authorization list and a reception authorization list which is distinct from the transmission authorization list, wherein the transmission authorization list includes the at least one first entity which authorizes the first user device to transmit the sharing information to the second user device of the at least one first entity, wherein the transmission authorization list is referred to when the first user device transmits the sharing information to the second user device, wherein the reception authorization list includes at least one second entity, wherein the entity of the first user device authorizes a third user device of the at least one second entity to transmit the sharing information including at least one of a status and a profile of the at least one second entity to the first user device, and wherein the reception authorization list is referred to when the first user device receives, from the third user device, the sharing information including at least one of the status and the profile of the at least one second entity.

9. The method of claim 8, further comprising storing the identification information in the list.

10. The method of claim 8, wherein transmitting the information comprises transmitting the sharing information directly to the first user device.

11. The method of claim 8, wherein the sharing information includes at least one of a phrase, an icon to indicate a status of a user corresponding to the first user device, and an image.

12. A machine-readable storage device storing instructions that, when executed by one or more processors, cause the one or more processors to perform operations comprising:
determining, by the one or more processors of a first user device, that sharing information to be shared from the first user device is updated, wherein the sharing information includes information on at least one of a status or a profile of an entity of the first user device;
identifying, by the one or more processors of the first user device, at least one first entity included in an authorization list in response to determining that the sharing information is updated, wherein the authorization list includes address information corresponding to the at least one first entity; and
transmitting, by a communication circuitry of the first user device, in response to identifying the at least one first entity, the updated sharing information to a second user device corresponding to the at least one first entity using the address information of the identified at least one first entity through a direct communication path between the first user device and the second user device without passing through a separate server, using a peer-to-peer (P2P) scheme, wherein determining that sharing information to be shared from the first user device is updated comprises detecting an update of at least one of a profile picture or an introduction phrase which is the profile information, wherein the authorization list includes a transmission authorization list and a reception authorization list which is distinct from the transmission authorization list, wherein the transmission authorization list includes the at least one first entity which authorizes the first user device to transmit the sharing information to the second user device of the at least one first entity, wherein the transmission authorization list is referred to when the first user device transmits the sharing information to the second user device, wherein the reception authorization list includes at least one second entity, wherein the entity of the first user device authorizes a third user device of the at least one second entity to transmit the sharing information including at least one of a status and a profile of the at least one second entity to the first user device, and wherein the reception authorization list is referred to when the first user device receives, from the third user device, the sharing information including at least one of the status and the profile of the at least one second entity.

\* \* \* \* \*